No. 12,536. REISSUED OCT. 2, 1906.

D. BAKER.

FURNACE CHARGING MECHANISM.

APPLICATION FILED MAR. 19, 1906.

2 SHEETS—SHEET 1.

Witnesses

L. E. Morrison

A. W. E. Kennedy

Inventor

David Baker

By Philip T. Dodge Attorney

No. 12,536. REISSUED OCT. 2, 1906.

D. BAKER.

FURNACE CHARGING MECHANISM.

APPLICATION FILED MAR. 19, 1906.

2 SHEETS—SHEET 2.

Witnesses

L. E. Morrison

A. M. E. Kennedy

Inventor

David Baker

By Philip T. Dodge Attorney

UNITED STATES PATENT OFFICE.

DAVID BAKER, OF WAYNE, PENNSYLVANIA, ASSIGNOR OF ONE-HALF TO ALBRECHT B. NEUMANN, OF JOLIET, ILLINOIS.

FURNACE-CHARGING MECHANISM.

No. 12,536. Specification of Reissued Letters Patent. Reissued Oct. 2, 1906.

Original No. 814,506, dated March 6, 1906. Application for reissue filed March 19, 1906. Serial No. 306,933.

*To all whom it may concern:*

Be it known that I, DAVID BAKER, of Wayne, county of Delaware, and State of Pennsylvania, have invented a new and useful Improvement in Furnace-Charging Mechanism, of which the following is a specification.

This invention relates to mechanism for charging blast-furnaces, the object of the invention being to provide an inexpensive device of simple construction in which the liability of derangement or "breakdowns" will be reduced to a minimum.

The invention is applicable more particularly to the type of charging device known in the art as "bell and hopper;" and the invention consists in so forming the distributing-bell that when it is actuated to open the hopper it will cause the charging materials to be discharged to one side, means being provided for changing or shifting the position of the bell around a vertical axis, so that the point of discharge may be varied, thereby insuring an even and uniform distribution of the materials in the furnace and preventing the sorting of the stock, the formation of "scaffolds," and imperfect combustion.

In the accompanying drawings I have represented my invention as embodied in a charging mechanism of the double-bell type, in which the main hopper is closed at its lower end by a main distributing-bell and is surmounted by a hopper closed by an auxiliary bell, the said bells being arranged to be opened alternately and each when closed acting as a gas seal when the other is open. It will be understood, however, that the invention is applicable as well to a furnace equipped with a single distributing-bell and provided with suitable means for preventing the escape of gas when the bell is open.

Figure 1:
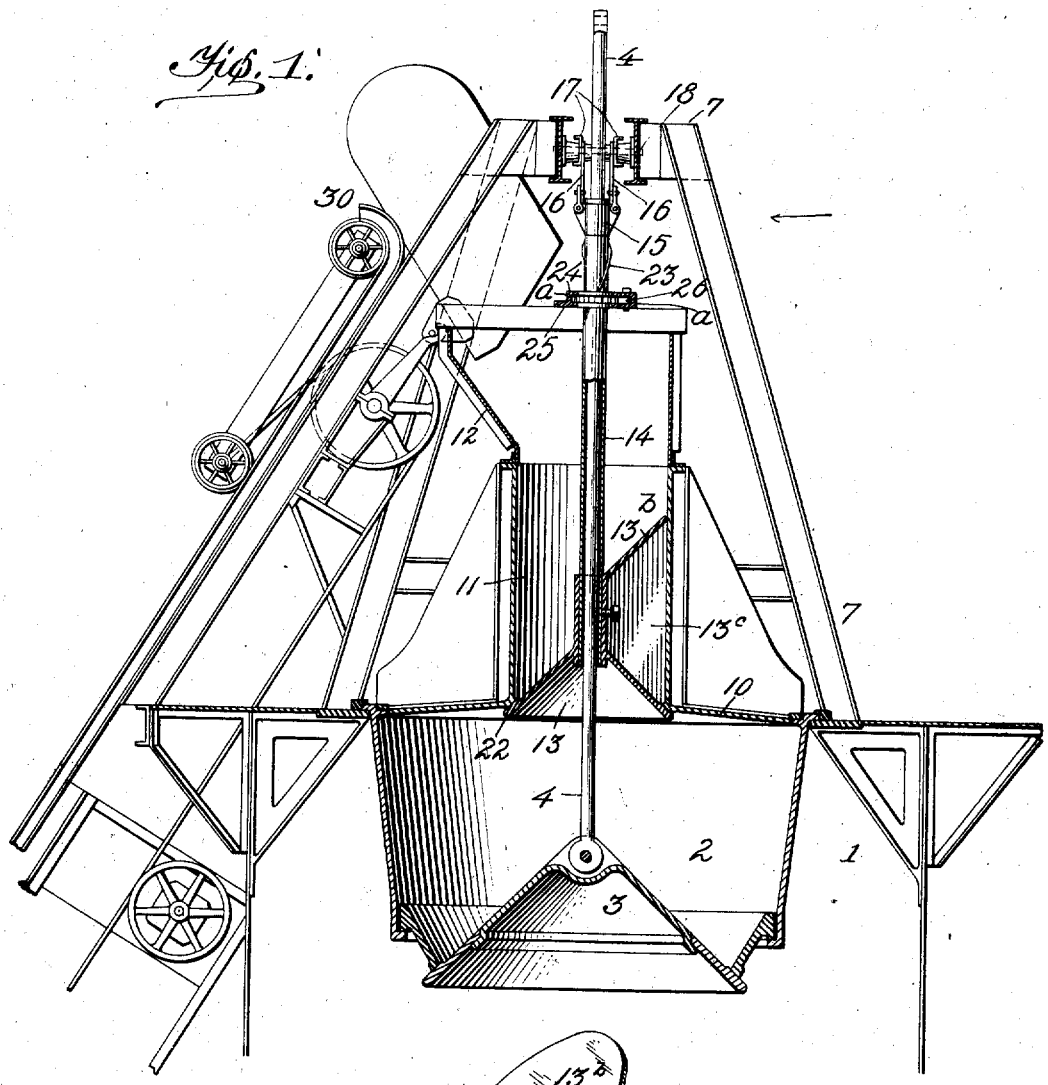
Figure 7:
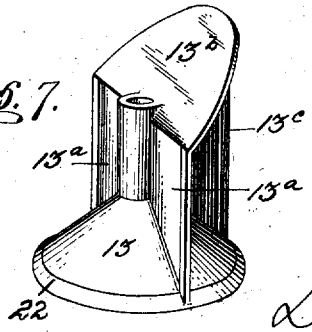
Figure 2:
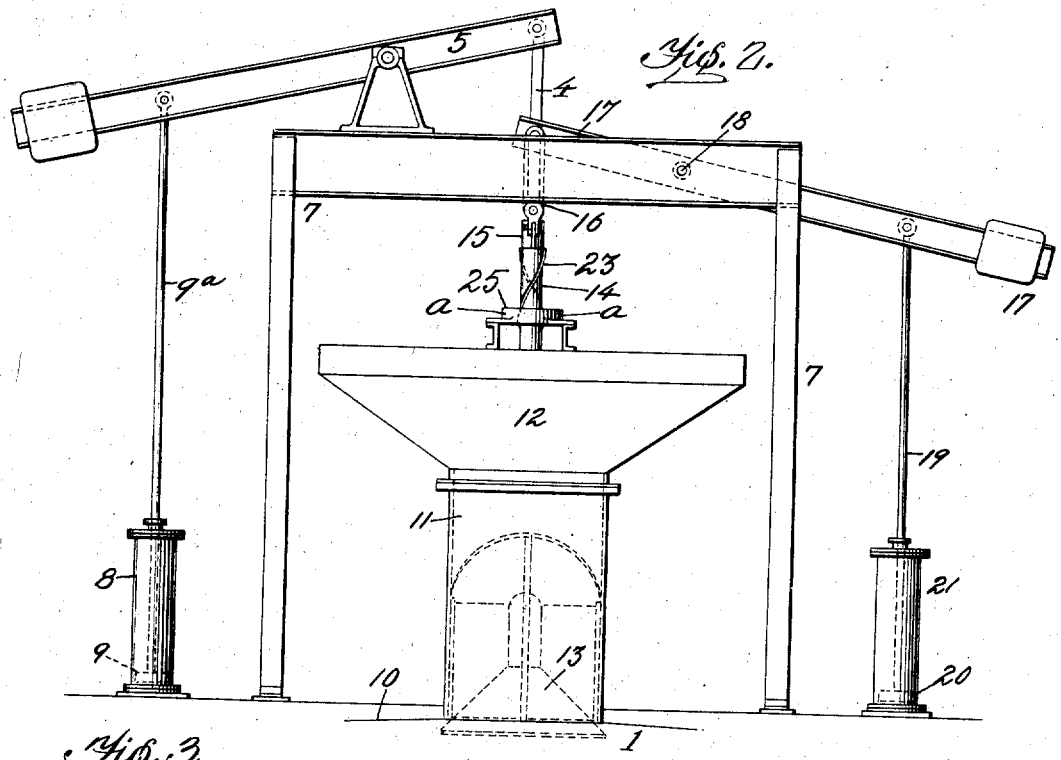
Figure 3:
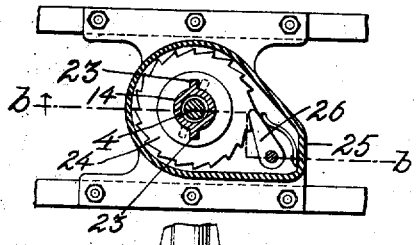
Figure 5:
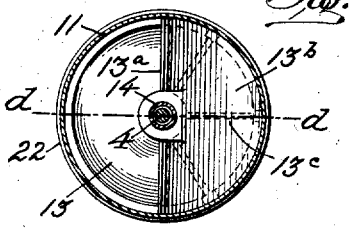
Figure 4:
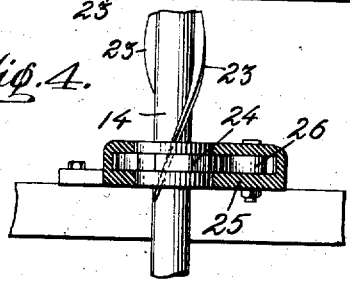
Figure 6:
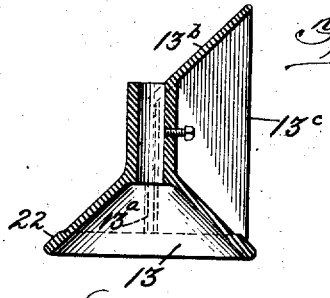

In the accompanying drawings, Figure 1 is a vertical sectional elevation through the upper end of a blast-furnace having my invention applied thereto. Fig. 2 is an elevation of the same as viewed in the direction of the arrow, Fig. 1. Fig. 3 is a horizontal sectional plan view on the line *a a* of the preceding figures, showing the mechanism for shifting the distributing-bell on a vertical axis. Fig. 4 is a vertical sectional elevation through the same on the line *b b*. Fig. 5 is a top plan view of the auxiliary distributing-bell. Fig. 6 is a vertical longitudinal sectional elevation of the same on the line *d d*. Fig. 7 is a perspective view of the auxiliary distributing-bell.

Referring to the drawings, 1 represents the upper end of a blast-furnace formed with a main hopper 2, communicating with the interior of the furnace, which hopper is closed in its lower end by a main distributing-bell 3, adapted, as usual, to be raised and lowered to close and open the hopper respectively and formed, as usual, with sloping sides, constituting a distributing-surface by which the materials falling on the bell are directed outwardly. The bell is suspended on the lower end of a vertical rod 4, jointed at its upper end to the inner end of a counterweighted operating-lever 5, pivoted between its ends to the superstructure 7 of the furnace and operated by means of a cylinder 8, containing a piston 9, connected with the lever by rod $9^a$, the admission of fluid under pressure to the cylinder serving to raise the piston, and thereby lower the bell, which is closed by the counterweighted lever when the pressure is cut off from the cylinder and the latter opened to the exhaust.

The top of the main hopper is closed by a plate 10, containing a central opening, over which rises a charging-cylinder 11, provided at its upper end with a receiving-hopper 12. The lower end of the charging-cylinder is closed by an auxiliary distributing-bell 13, having sloping sides constituting a distributing-surface, a portion only of which surface is exposed to the fall of the stock fed to the cylinder, as will be more fully described later on. This bell is carried on the lower end of a tubular stem 14, loosely inclosing the rod 4 and swiveled at its upper end in a collar 15, suspended by links 16, jointed at their upper ends to the inner end of a counterweighted operating-lever 17. The lever 17 is pivoted between its ends, as at 18, to the superstructure of the furnace and is connected, by means of rod 19, with a piston 20, working in a cylinder 21, the admission of fluid under pressure thereto serving to lower the bell and open the charging-cylinder, which bell is closed by the counterweighted lever when pressure is cut off from the cylinder and the latter opened to the exhaust.

The mechanism for operating the bells may of course be of any appropriate character; but I have represented a type commonly and universally employed for this purpose.

In applying my invention to a structure of this character I so form the auxiliary bell 13 that when in closed position it will cause the stock entering the charging-cylinder to be accumulated to one side, so that when opened it will be discharged to one side, and I provide means for shifting the position of the bell around a vertical axis after it has been lowered, with the result that the charging material will be accumulated at different points around the cylinder and will be caused to enter the furnace in corresponding positions. In order to effect these actions, the auxiliary bell is formed with a vertical surface or wall $13^a$, extending upwardly some distance from the center of its sloping distributing-surface and the full width of the bell, the side edges of which wall extend closely along the inner surface of the charging-cylinder. At its upper end the wall is deflected and extends at an inclination upward and outward, forming an inclined shield $13^b$, the edge of which is curved to conform to the curvature of the cylinder. This shield is held and braced in position by means of a vertical plate or web $13^c$, extending upward from the surface of the bell and having its upper edge inclined upward and outward and connected with the under side of the shield.

The side edges of the vertical wall $13^a$ and the outer edge of the plate $13^c$ constitute, in effect, guiding-ribs, which during the movements of the bell maintain the same centrally within the charging-cylinder and prevent its lateral displacements by the stock. The lower edges of the vertical wall and the plate $13^c$ terminate a short distance above the lower peripheral edge of the bell, thus leaving an annular inclined surface 22, which when the bell is in closed position is adapted to fit the extreme lower end of the charging-cylinder and form a gas seal.

From the foregoing description it will be seen that but a portion of the distributing-surface of the auxiliary bell is exposed within the cylinder, the vertical wall and the inclined shield inclosing the remainder of the bell and constituting, in connection with the charging-cylinder, a receiving chamber or cavity semicircular in cross-section and disposed at one side of the cylinder, into which receiving-cavity the stock entering the cylinder will be directed and will accumulate on the exposed surface of the bell. It is obvious, of course, that the vertical wall $13^a$ instead of extending diametrically across the cylinder, as shown, may have its face disposed at an angle, as shown by dotted lines in Fig. 5, which would have the effect of increasing the cross-sectional area of the receiving-cavity.

The shifting of the bell around a vertical axis in order to change the position of the receiving-cavity, or, in other words, the point at which the stock is discharged into the main hopper, is effected automatically by the rise of the bell in its closing movement. This action is conveniently effected by the mechanism shown more particularly in Figs. 3 and 4, where it will be seen that the tubular stem of the auxiliary bell is provided near its upper end and on opposite sides with spiral ribs or wings 23, fitting loosely in radial grooves or slots in a horizontal ratchet-wheel 24, having a central circular opening through which the tubular stem 14 loosely extends. The ratchet-wheel is mounted in bearings in a casing 25, sustained in the upper end of the receiving-hopper, and the teeth of the wheel are engaged by a spring-actuated pawl 26, which will permit movement of the wheel in one direction only. As a result when the stem is moved vertically through the ratchet-wheel in one direction the wheel will be caused by the spiral ribs to turn around; but when the stem is moved in the opposite direction, the wheel being held by the pawl against reverse movement, the spiral ribs will impart a turning movement to the stem, which movement will be transmitted to the bell and will shift the same around a vertical axis.

The direction of inclination of the spiral ribs and the relative arrangement of the spring-actuated pawl is such that the ratchet will be permitted to turn only when the stem moves downward on the opening of the bell, so that when the stem is moved upward to close the bell the latter will be shifted in position. I prefer to arrange the spiral ribs at such pitch that in the closing movement of the bell it will be turned one hundred and eighty-six degrees; but of course the extent of revolution may be changed to meet different conditions.

The operation of the mechanism is as follows: The charging materials being fed into the receiving-hopper by any appropriate means—in the present instance by the skip-cars 30—the materials are directed by the inclined shield $13^b$ onto the exposed surface of the bell and accumulate at the side of the cylinder in the receiving-cavity formed conjointly by the bell and cylinder. Pressure being admitted to cylinder 21, the auxiliary bell will be lowered and the contents of the cylinder will be discharged to one side and will fall on the main distributing-bell at the side of the main hopper. During the downward movement of the auxiliary bell, its stem sliding through the ratchet-wheel, the spiral ribs will cause the wheel to turn, the pawl during this movement slipping over the ratchet-teeth. Pressure is now cut off from cylinder 21 and the same opened to the exhaust, whereupon weighted lever 17 will raise the auxiliary bell, and as the ratchet-wheel is held by its pawl against rotation the passage of the spiral ribs therethrough will turn the stem and rotate the bell, thereby changing its position and bringing the receiving-cavity at a different point around the cylinder. Another skip-load is now discharged into the receiving-hopper, and falling on the bell will accumulate at the side of the cylinder at a different point from that where the first load accumulated. Cylinder 21 is now operated to actuate the auxiliary bell and discharge the second load into the main hopper. These operations are continued until a complete furnace charge has been delivered to the main hopper with the individual skip-loads at different points therein. Cylinder 8 is now operated, and the contents of the main hopper are directed into the furnace, the different ingredients and loads being distributed therein in the order in which they were arranged in the main hopper by the successive actions of the auxiliary bell.

It will be observed that my mechanism is of extreme simplicity, is composed of few operative parts, is effective in action, and there is little or no liability of its parts becoming deranged. The effect of the successive actions of the auxiliary bell in its different receiving positions is to direct the successive skip-loads into the main hopper at predetermined intervals around the periphery of the main bell, the result being that a uniform and even distribution of the materials is possible, and the sorting of the stock and the consequent serious objections entirely prevented.

Having thus described my invention, what I claim is—

1. In a furnace-charging mechanism the combination with a receiving-chamber communicating with the interior of the furnace, of a distributing-bell adapted to close the lower end of said chamber and constructed to accumulate the stock delivered to the chamber to one side of the same when the bell is in closed position, means for opening the distributing-bell to discharge the contents of the chamber, and means for shifting the position of the bell to vary the point of discharge.

2. In a furnace-charging mechanism the combination with a vertical receiving-cylinder, of a vertically-movable distributing-bell adapted to close the lower end of the cylinder, said bell being constructed with relation to the cylinder to form a receiving-cavity within the cylinder extending but partly around the same, means for feeding the charging material into the top of the cylinder, means for lowering the bell to discharge the contents of the cylinder, and means for changing the position of the bell around a vertical axis.

3. In a furnace-charging mechanism the combination of a main hopper, its closure, a receiving-cylinder rising therefrom, a vertically-movable distributing-bell closing the lower end of the receiving-cylinder, means carried by the bell for accumulating the stock entering the cylinder to one side, means for lowering the bell to discharge the contents of the cylinder, and means for shifting the position of the bell between the successive discharges of the material.

4. In a furnace-charging mechanism the combination with a receiving-cylinder communicating with the interior of the furnace, of a vertically-movable distributing-bell adapted when in raised position to close the communication of the cylinder with the furnace, means carried by the bell for accumulating the stock to the side when the bell is closed, means for lowering the bell to discharge the contents of the cylinder, means for raising the bell to close the cylinder, and means controlled by the rising movement of the bell for shifting the same around a vertical axis.

5. In a furnace-charging mechanism the combination with a receiving-cylinder, of a distributing-bell adapted to close the lower end of the same, a vertical rotary stem to which the bell is fixed, means for raising and lowering the stem and means controlled by the vertical movement of the stem for rotating it.

6. In combination with a receiving-cylinder, a distributing-bell closing the same, a vertical rotary stem to which the bell is fixed, means for moving the stem vertically, a spiral rib on the stem, a rotary member affixed against vertical movement and formed with an opening to receive the stem and having a groove to receive the spiral rib, and means for preventing the rotation of said member in one direction only.

7. In a furnace-charging mechanism, the combination with a receiving-cylinder, of a distributing-bell closing the same, a rotary vertically-movable stem fixed to the bell, a spiral rib on said stem, a horizontal ratchet-wheel formed with an opening to receive the stem and with a groove to receive the spiral rib, a pawl engaging the ratchet-wheel, and means for moving the stem vertically.

8. In a furnace-charging mechanism the combination with a receiving-cylinder, of a distributing-bell closing the lower end of the same, said bell having a portion only of its distributing-surface exposed to the fall of the material fed into the cylinder, and means for shifting the position of the bell to adjust the exposed portion of the same to different points around the cylinder.

9. In a furnace-charging mechanism and in combination with a receiving-cylinder, a distributing bell therefor, an upright wall rising from its distributing-surface, and means for directing the stock to one side of said wall.

10. In a furnace-charging mechanism and in combination with a receiving-chamber, a relatively movable distributing-bell for closing the same, a shield carried by the bell and acting to direct the stock fed to the chamber to one side, and means for shifting the position of the bell with reference to the chamber to vary the point of discharge of the stock.

11. In a furnace-charging mechanism and in combination with a receiving-cylinder, a distributing-bell closing the same, an upright wall carried by the bell and extending across the cylinder, and an inclined shield extending upward and outward from the upper end of the wall, and having its edge curved to conform to the curvature of the cylinder.

12. A distributer for blast or similar furnaces consisting of a chute and a distributing-plate diagonally disposed in the chute, means for raising and lowering the distributing-plate, and means for imparting a partial revolution thereto.

13. In a distributer for blast and similar furnaces, the combination of a discharging-hopper, means for controlling the discharge from the hopper, a chute leading thereto, a discharging-plate diagonally disposed in the chute, a shaft for raising and lowering the discharging-plate, and means for imparting a partial revolution to the shalt.

14. A distributer for blast or similar furnaces, consisting of a lower discharging-hopper, a conical bell adapted when in raised position to close the mouth of the discharging-hopper, a shaft by which the bell is supported, a chute opening into the lower or discharging hopper, a distributing-plate diagonally disposed in the chute, a tubular shaft surrounding the first-mentioned shaft, to which the distributing-plate is secured, means for raising and lowering the tubular shaft, means for imparting a partial revolution thereto, and means for raising and lowering the shaft supporting the lower bell.

15. A distributer for blast or similar furnaces, consisting of a discharging-hopper having converging side walls, a bell adapted when raised to close the mouth of the discharging-hopper, a chute opening into the discharging-hopper, a bell adapted when raised to close the mouth of the chute, a distributing-plate secured to the bell and extending diagonally across the chute, a tubular shaft to which the last-mentioned bell and distributing-plate are secured, means for raising and lowering the tubular shaft, means for imparting a partial revolution thereto, and a second shaft passing through the tubular shaft and connected with the discharging-bell and adapted to be raised and lowered.

16. In combination with a furnace, a main hopper and bell, a receiving-hopper above the main hopper, a vertically-movable closure controlling the discharge of the materials from the receiving-hopper, a distributing-plate situated in the receiving-hopper and adapted to direct the materials entering the same to one side, and means for turning the distributing-plate around horizontally to vary the direction of the flow of the materials.

17. In a furnace-charging mechanism, the combination of a receiving-chute, a distributing-plate therein, a closure for the chute movable vertically relatively to the same, and means controlled by the vertical movement of the closure for shifting the position of the plate around a vertical axis.

18. A distributer for blast or similar furnaces consisting of a chute, a distributing-plate diagonally disposed in the chute, a bell movable vertically and adapted to control the discharge of the materials from the chute, and suitable connections between the bell and plate formed to impart a partial revolution to the plate as the bell is moved vertically.

19. In combination with the main hopper and bell, a receiving-chute, a vertically-movable distributing-bell controlling the discharge of the materials from the receiving-chute, a distributing-plate diagonally disposed in the chute, and means dependent upon the movement of said distributing-bell for imparting a turning movement to the plate.

20. The combination of a receiving-chute, a distributing-plate therein, a closure for the chute movable vertically to open and closed positions, a distributing-plate diagonally disposed in the chute, a source of power for operating the closure, and means controlled by said source of power for moving the plate around a vertical axis to vary the position of the same in the chute.

In testimony whereof I hereunto set my hand, this 10th day of March, 1906, in the presence of two attesting witnesses.

DAVID BAKER.

Witnesses:

J. L. POULTNEY,

LOUISE B. MORRIS.